(No Model.)
G. D. ROBERTS.
CROSSCUT SAW.
No. 534,698. Patented Feb. 26, 1895.
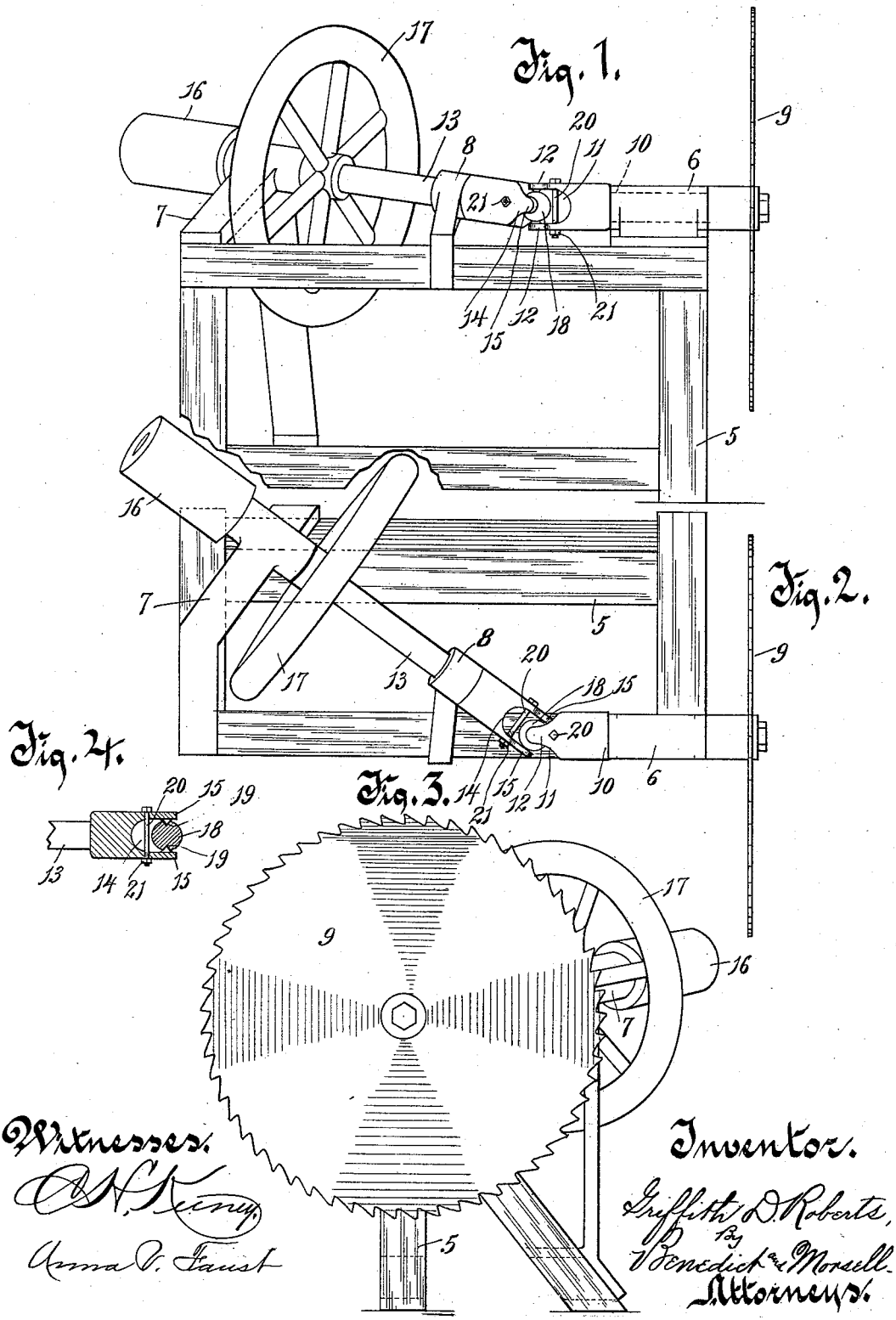

UNITED STATES PATENT OFFICE.

GRIFFITH D. ROBERTS, OF COLUMBUS, WISCONSIN.

CROSSCUT-SAW.

SPECIFICATION forming part of Letters Patent No. 534,698, dated February 26, 1895.

Application filed June 28, 1894. Serial No. 515,965. (No model.)

*To all whom it may concern:*

Be it known that I, GRIFFITH D. ROBERTS, of Columbus, in the county of Columbia and State of Wisconsin, have invented a new and useful Improvement in Crosscut-Saws, of which the following is a description, reference being had to the accompanying drawings, which are a part of this specification.

My invention has relation to improvements in cross cut saws.

Cross cut saws as ordinarily arranged are objectionable owing to the fact that the circular saw and the balance wheel are mounted at opposite ends of a shaft in such manner that the wood or log comes into contact with the saw and balance wheel at the same time.

It is the object of my invention to obviate the above-described difficulty in a novel and simple manner, so that the wood gets the full benefit of the saw without interfering with the balance wheel.

With the above object in view, the invention consists of the devices and parts, or their equivalents, whereby the balance wheel is arranged out of line with the saw, as hereinafter more fully described and claimed.

In the accompanying drawings, Figure 1, is a side elevation of the complete device. Fig. 2, is a plan view. Fig. 3, is an end elevation, and Fig. 4, is a sectional view through the end of one shaft section.

Like numerals of reference denote like parts throughout the several views.

Referring to the drawings, the numeral 5 indicates the frame of the machine, the top of which being provided with the opposite end bearings 6 and 7, and an intermediate bearing 8. The bearing 7 extends above, and out of longitudinal alignment with the opposite end bearing 6, as clearly shown.

The numeral 9 indicates a cross-cut saw which is mounted upon the end of a shaft section 10, said shaft section journaled in the bearing 6. The inner end of shaft 10 is slightly enlarged, and provided with a U-shaped recess 11, said U-shaped recess provided with oppositely disposed inwardly-extending pointed lugs 12, 12.

The numeral 13 indicates another section of shaft, the inner end of which is likewise provided with a U-shaped recess 14 disposed at right angles to the recess 11 of shaft 10.

Projecting inwardly from the opposite sides of this U-shaped recess 14 are pointed lugs 15, 15. The shaft 13 is mounted in the end bearing 7 and the medial bearing 8, which latter bearing is also lower than the bearing 7, and out of line with the bearing 6. It will, therefore, of course be seen that the shaft section 13 must necessarily be disposed out of line with, and at a gradual upward incline from, the shaft section 10. Upon its outer end the shaft section 13 carries a pulley wheel 16, and intermediate its ends a fly-wheel 17.

The numeral 18 indicates a ball, which is provided with four V-shaped indentations 19, 19. This ball is adapted to be sprung in between the ends of the U-shaped recesses of the shafts 10 and 13, and the V-shaped indentations thereof to be engaged by the pointed lugs 12 and 15 of the respective shafts. From this construction, it will be seen that practically a universal joint is formed which permits the shaft section 13 to assume the position shown and described, and also to permit the two shaft sections to be rotated in unison. When the ends of the U-shaped recesses are sprung apart in the manner just described to admit of the insertion of the ball, it is of course necessary that said ends should be brought close together again, or else the ball would quickly work out of place. For accomplishing this, I provide the bolts 20, 20 which intersect the recesses, said bolts being tightened by means of nuts 21, 21 engaging the threaded ends thereof.

From the above description it will be seen that I provide a construction whereby the wood can be arranged to the best advantage to secure the full benefit of the saw, while at the same time the free rotation of the fly wheel is not interfered with, by reason of contact with the wood, owing to the lateral displacement of the section of shaft carrying the fly wheel.

Having thus described my invention, what I claim, and desire to secure by Letters Patent, is—

1. In a cross cut saw, the combination, of universally-jointed shaft sections, one of said sections carrying a saw, and the other a fly wheel, means for rotating the shaft-sections, and bearings for said sections, the bearings for the section carrying the fly-wheel being located out of longitudinal alignment with the bearing of the other section, substantially as set forth.

2. The combination, of universally-jointed shaft sections, a saw mounted upon one of said sections, and a fly wheel mounted upon the other section, substantially as set forth.

3. The combination, of shaft sections having their contiguous ends provided with recesses disposed at right angles to each other, said recesses, respectively, provided with inwardly-extending lugs, a ball fitting in the respective recesses, said ball provided with indentations to receive the lugs, bolts intersecting the end recesses, and provided upon their threaded ends with nuts, a saw mounted upon one section of shaft, and a fly wheel mounted upon the other section, substantially as set forth.

4. In a cross cut saw, the combination, of a frame, end bearings and an intermediate bearing thereon, one of said end bearings being located to one side of the intermediate bearing, universally-jointed shaft sections, one of said sections carrying a saw, and the other a fly wheel, and means for rotating the shaft sections, substantially as set forth.

In testimony whereof I affix my signature in presence of two witnesses.

GRIFFITH D. ROBERTS.

Witnesses:
W. G. COLES,
W. J. EDWARDS.